United States Patent [19]

MacLean et al.

[11] Patent Number: 5,231,833
[45] Date of Patent: Aug. 3, 1993

[54] GAS TURBINE ENGINE FUEL MANIFOLD

[75] Inventors: Thomas MacLean, Loveland; George E. Cook, Cincinnati, both of Ohio

[73] Assignee: General Electric Company, Cincinnati, Ohio

[21] Appl. No.: 891,925

[22] Filed: Jun. 1, 1992

Related U.S. Application Data

[63] Continuation of Ser. No. 642,780, Jan. 18, 1991, abandoned.

[51] Int. Cl.[5] .......................... F02C 1/00; F02G 3/00
[52] U.S. Cl. ........................ 60/734; 60/739; 60/753
[58] Field of Search .......... 60/734, 739, 753, 39.36; 431/166, 187

[56] References Cited

U.S. PATENT DOCUMENTS

| | | | |
|---|---|---|---|
| 2,727,358 | 12/1955 | Howes | 60/39.36 |
| 3,516,252 | 6/1970 | Udell et al. | 60/739 |
| 4,402,184 | 9/1983 | Faulkner et al. | 60/739 |
| 4,467,610 | 8/1984 | Pearson et al. | 60/739 |
| 4,735,044 | 4/1988 | Richey et al. | 60/742 |
| 5,031,407 | 7/1991 | Zaremba et al. | 60/739 |
| 5,036,657 | 8/1991 | Seto et al. | 60/739 |

FOREIGN PATENT DOCUMENTS

| | | | |
|---|---|---|---|
| 613399 | 1/1961 | Canada | 60/739 |
| 1186524 | 8/1959 | France . | |
| 1380744 | 10/1964 | France . | |
| 2336556 | 7/1977 | France . | |
| 0666340 | 7/1988 | Switzerland . | |
| 829579 | 3/1960 | United Kingdom . | |

Primary Examiner—Richard A. Bertsch
Assistant Examiner—Howard R. Richman
Attorney, Agent, or Firm—Jerome C. Squillaro; James P. Davidson

[57] ABSTRACT

A fuel manifold is disclosed for providing fuel to a combustor disposed radially inside an annular casing. The manifold is disposed inside the casing and includes an arcuate manifold tube, a thermal insulation layer surrounding the tube, and a cover layer surrounding the insulation layer which is substantially rigid for protecting the insulation layer from physical damage.

10 Claims, 3 Drawing Sheets

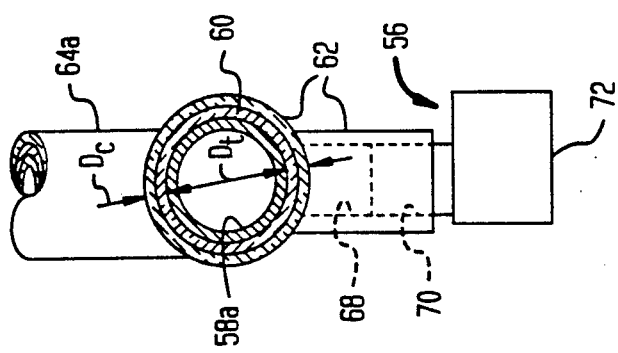
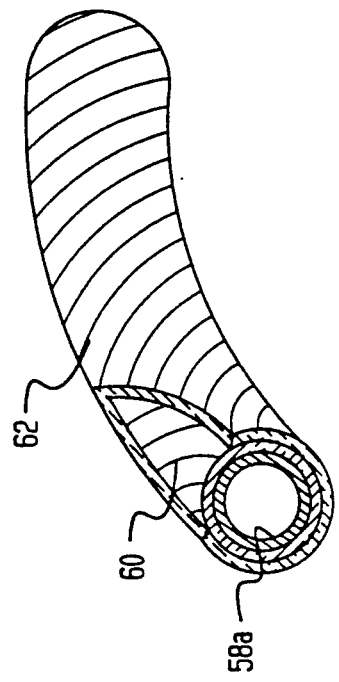
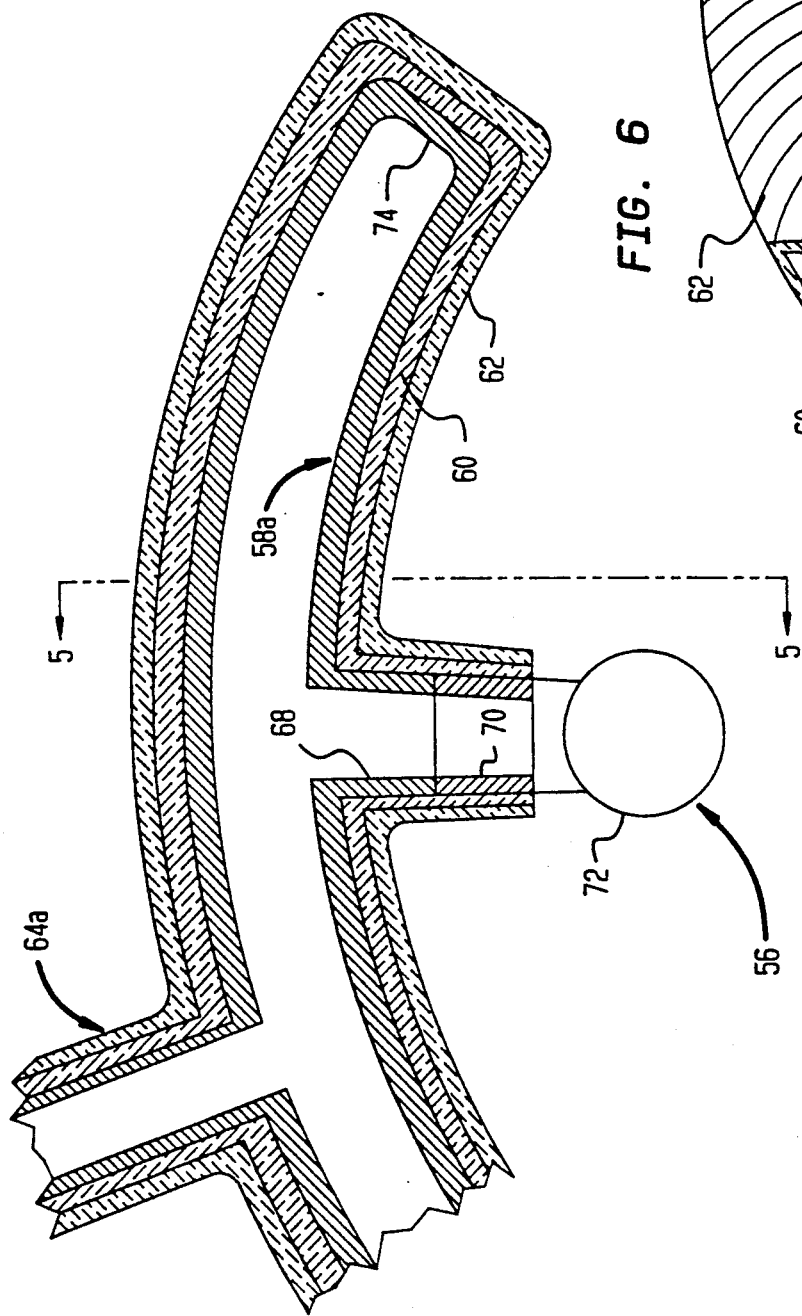

GAS TURBINE ENGINE FUEL MANIFOLD

This application is a continuation of application Ser. No. 07/642,780, filed Jan. 18, 1991, now abandoned.

TECHNICAL FIELD

The present invention relates generally to gas turbine engines, and, more specifically, to fuel manifolds for providing fuel to a combustor thereof.

BACKGROUND ART

Conventional gas turbine engines include an annular combustor having a plurality of circumferentially spaced carburetors disposed in an annular dome at an upstream end thereof. The combustor is disposed radially inside an annular casing and is provided with hot compressor discharge air which, depending on particular engine designs, may be from about 1,000° F. (538° C.) to about 1,400° F. (760° C.). To channel fuel to the carburetors within the annular casing, conventional fuel stems extend to the carburetors from an annular manifold surrounding the casing. The fuel stems are exposed to the hot compressor discharge air and must be suitably constructed for channeling the fuel without adverse effect.

For example, conventional fuel manifolds and the fuel stems are made from stainless steel or Hastolly X to provide adequate strength for withstanding the fuel pressure therein. These metals are also preferred since they do not react chemically with the fuel at the relatively high temperatures in the environment of the combustor. Although these metals have these advantages, they also have the disadvantage of having relatively high thermal conductivity which allows heat to be transferred to the fuel flowing in the manifold and fuel stems, which will raise the temperature of the fuel unless suitable means are provided for protecting the fuel.

The fuel stems exposed to the compressor discharge air are typically designed to be cooled, for example by the fuel itself or by insulating air gaps, to ensure that the temperature of the fuel being channeled therethrough does not reach unacceptably high temperatures which would cause undesirable coking of the fuel inside the fuel channels. It is desirable to maintain the internal wetted wall temperature of the fuel tubes or conduits less than about 350° F. (177° C.) for preventing coking of the fuel therein.

In order to meet this requirement, conventional fuel manifolds are mounted outside the casing surrounding the combustor wherein the environment is substantially cooler than that inside the casing wherein the compressor discharge air flows. Since conventional fuel manifolds typically extend about 360° around the engine centerline and the casing surrounding the combustor, they are relatively large diameter structures and therefore increase the weight and envelope of the engine. Although the fuel stems connecting the manifold to the fuel injectors in the carburetors extend through the casing to the combustor in the environment of the hot compressor discharge air, they typically have relatively small diameters and are relatively short, and therefore may be more effectively cooled by the fuel channeled therein, or by insulating air gaps therein.

OBJECTS OF THE INVENTION

Accordingly, one object of the present invention is to provide a new and improved fuel manifold for a gas turbine engine.

Another object of the present invention is to provide a fuel manifold which may be mounted internal to the casing surrounding the combustor for reducing the size of the manifold and, therefore, engine weight and engine envelope.

Another object of the present invention is to provide a fuel manifold effective for withstanding compressor discharge air temperatures without coking of the fuel flowing therein.

DISCLOSURE OF THE INVENTION

A fuel manifold is disclosed for providing fuel to a combustor disposed radially inside an annular casing in which flows hot compressor discharge air. The manifold is disposed inside the casing and includes an arcuate manifold tube, a thermal insulation layer surrounding the tube, and a cover layer surrounding the insulation layer which is substantially rigid for protecting the insulation layer from physical damage.

BRIEF DESCRIPTION OF DRAWINGS

The novel features believed characteristic of the invention are set forth and differentiated in the claims. The invention, in accordance with a preferred and exemplary embodiment, together with further objects and advantages thereof, is more particularly described in the following detailed description taken in conjunction with the accompanying drawing in which:

FIG. 4 is an enlarged, axial sectional view of a portion of one of the fuel manifold tubes illustrated in FIG. 3.

FIG. 5 is a transverse sectional view of the manifold tube illustrated in FIG. 4 taken along line 5—5.

FIG. 6 is a perspective view of a portion of the fuel manifold tube illustrated in FIG. 4.

MODE(S) FOR CARRYING OUT THE INVENTION

Figure 1:
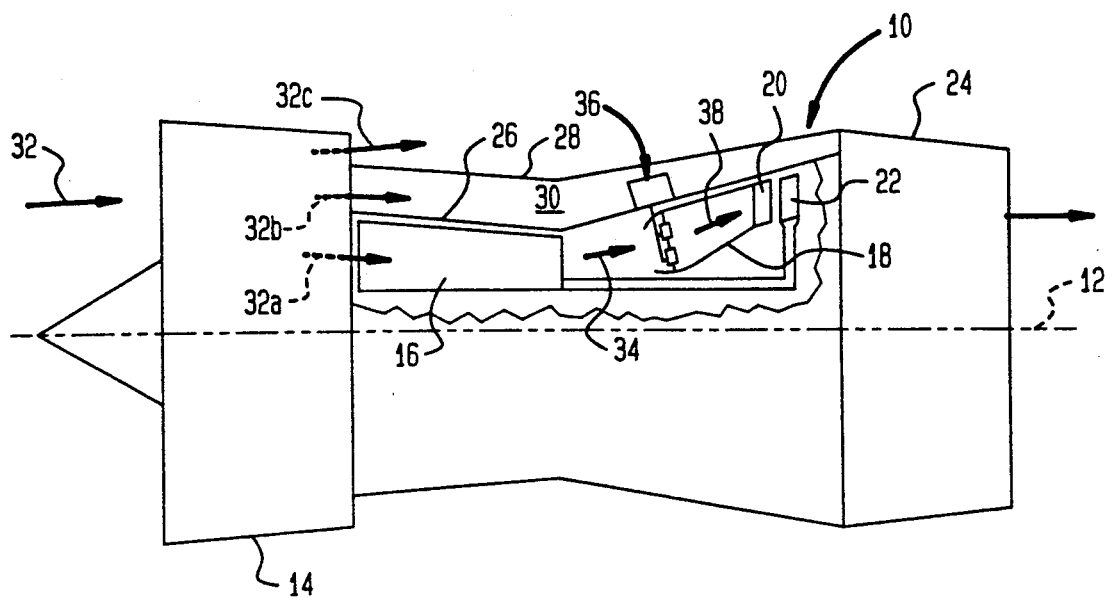
FIG. 1 is a longitudinal sectional view of a schematic high bypass turbofan engine including a fuel manifold in accordance with one embodiment of the present invention.

Illustrated in FIG. 1 is a schematic representation of an exemplary high bypass turbofan engine 10. The engine 10 includes a longitudinal centerline axis 12 around which are coaxially disposed in serial flow communication a conventional fan 14, a conventional compressor 16, a conventional combustor 18, a conventional high pressure turbine nozzle 20, a conventional high pressure turbine 22 suitably joined by a shaft to the compressor 16, and a conventional low pressure turbine 24 which conventionally drives the fan 14 through a shaft.

The compressor 16 and the combustor 18 are disposed radially inside an annular casing 26, and in this exemplary embodiment of the engine 10, an annular outer casing 28 surrounds the casing 26 to define an annular bypass duct 30. In conventional operation, ambient air 32 is channeled through the fan 14, a first portion 32a of which is channeled into the compressor 16, a second portion 32b is channeled through the bypass duct 30, and a third portion 32c is discharged from the fan 14 over the outer casing 28 for providing thrust for powering an aircraft (not shown) in flight. The air first portion 32a is compressed in the compressor 16 and forms relatively hot compressor discharge air 34 which is channeled to the combustor 18. A fuel manifold 36 in accordance with one embodiment of the present invention provides fuel to the combustor 18 which is mixed with a portion of the compressor discharge air 34 and conventionally ignited for generating combustion discharge gases 38 which flow through the nozzle 20, and turbines 22 and 24 for powering the fan 14 and the compressor 16.

Figure 2:
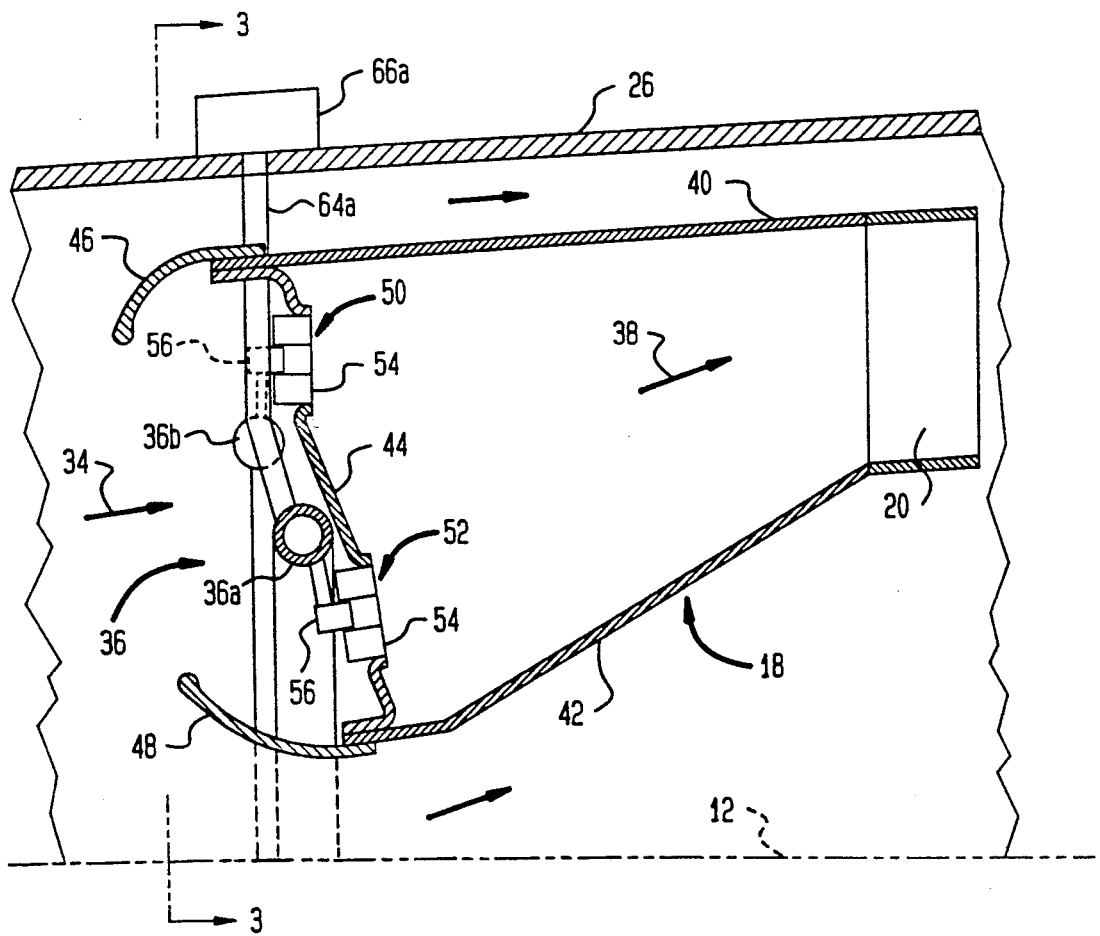
FIG. 2 is an enlarged longitudinal sectional view of the combustor region of the engine shown in FIG. 1 illustrating the fuel manifold in accordance with one embodiment of the present invention.

Illustrated in more particularity in FIG. 2 is an enlarged view of the region of the combustor 18 including the fuel manifold 36 of the present invention. The combustor 18 conventionally includes an annular, radially outer liner 40 and an annular, radially inner liner 42 spaced therefrom which are conventionally joined at upstream ends thereof to a conventional annular dome 44. Conventional outer and inner cowls 46 and 48 extend upstream from the dome 44 for conventionally channeling a portion of the compressor discharge air 34 to the dome 44 and portions over the outer surfaces of the liners 40 and 42.

In this exemplary embodiment of the combustor 18, the dome 44 is a double dome having a plurality of circumferentially spaced outer carburetors 50 and a plurality of circumferentially spaced inner carburetors 52. Each of the carburetors 50 and 52 includes a conventional air swirler 54 and a conventional fuel injector 56. Fuel is conventionally discharged from the fuel injector 56 and mixed with a portion of the compressor discharge air 34 in the swirler 54 for creating fuel/air mixtures which are conventionally ignited for forming the combustion gases 38.

In this exemplary embodiment of the present invention, the fuel manifold 36 includes a radially inner manifold 36a providing fuel to the inner carburetors 52, and a radially outer manifold 36b providing fuel to the outer carburetors 50. The inner and outer manifolds 36a and 36b are substantially identical to each other except in size and orientation and the following detailed description of the inner manifold 36a applies equally as well to the outer manifold 36b wherein certain like elements are identified by the suffix "b" added to the corresponding element numeral designation. Of course, the invention may also be practiced for a conventional single dome combustor having solely one row of circumferentially spaced carburetors.

Figure 3:
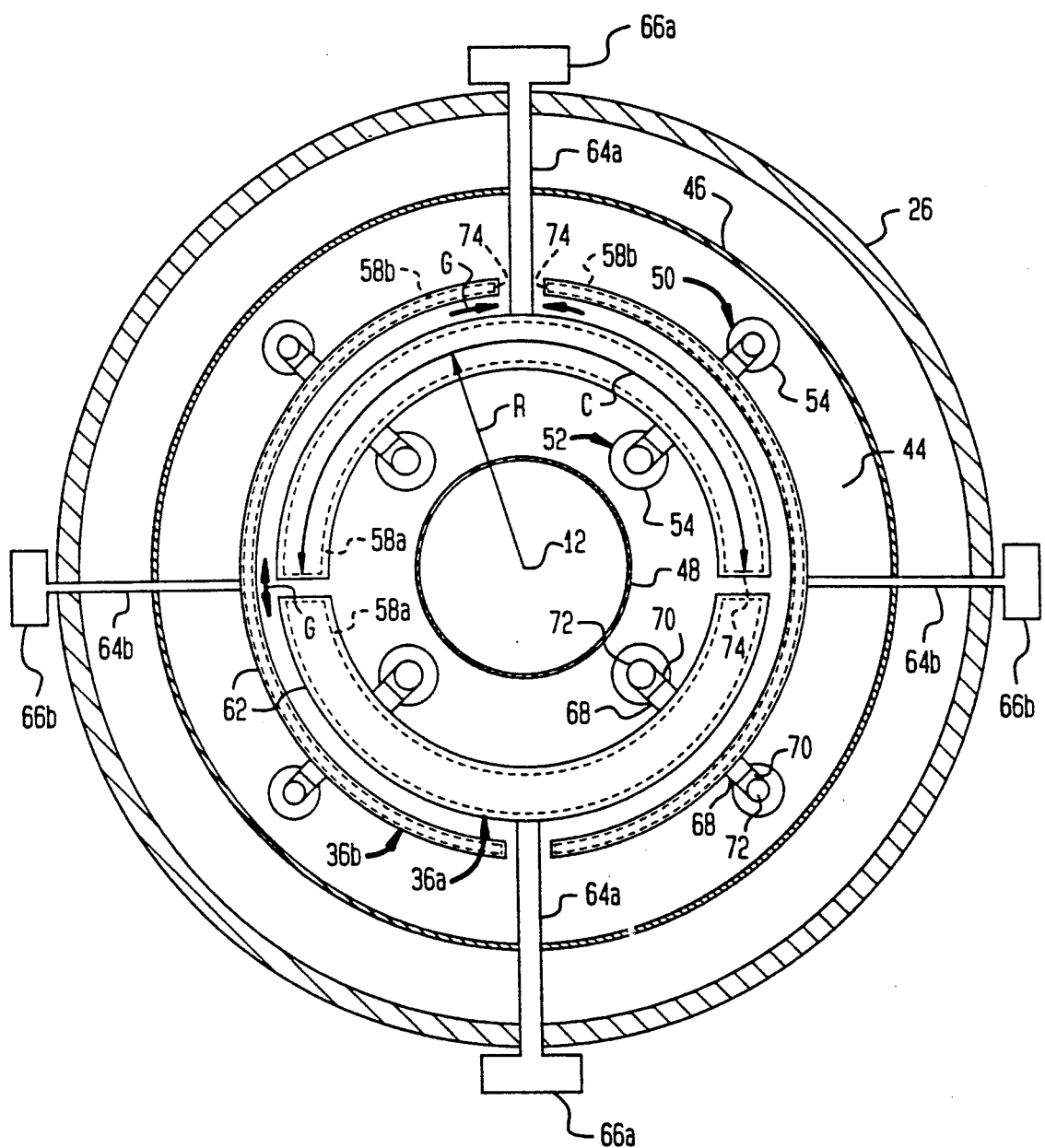
FIG. 3 is an axial, partly sectional view of the combustor and fuel manifold illustrated in FIG. 2 taken along line 3—3.

FIG. 3 illustrates an axial, aft facing view of the fuel manifolds 36a, 36b and the combustor 18. Only four outer and inner carburetors 50 and 52 are shown for clarity, it being understood that the number of circumferentially spaced carburetors is conventionally determined for each particular engine application. The fuel manifold 36a includes at least one, and in this exemplary embodiment two, arcuate inner manifold tubes 58a. The tubes 58a in the preferred embodiment are formed of conventional stainless steel such as 321 stainless steel having the designation AMS 5557, for enjoying the conventional advantages thereof.

In accordance with one feature of the present invention, the manifold tubes 58a are preferably disposed radially inside the casing 26 surrounding the combustor 18 for reducing their size, and therefore engine weight and engine envelope. For example, the two manifold tubes 58a are preferably disposed coaxially with each other at a common radius around the engine centerline axis 12 and together extend circumferentially about 360° for forming a ring. Also in the preferred embodiment, each of the manifold tubes 58a extends circumferentially about 180°. The manifold tubes 58a, as more particularly illustrated in FIG. 2, are also preferably disposed upstream of the dome 44 and radially between the outer and inner liners 40 and 42, and radially between the outer and inner cowls 46 and 48. In this way, the manifold tubes 58a are located relatively close to the carburetors 52, and thusly reduce the size of the fuel manifold 36a for reducing engine weight and envelope.

However, since the manifold 36a is disposed inside the casing 26 and upstream of the dome 44 it is subject to the high temperature compressor discharge air 34 which would lead to unacceptable coking of the fuel therein but for the provisions of the present invention.

More specifically, and in accordance with the present invention, a thermal insulation layer 60 as shown in more particularity in FIGS. 4 and 5 preferably completely surrounds the manifold tube 58a for providing thermal protection thereof. The thermal insulation layer 60 preferably has a thermal conductivity which is as low as possible. In one embodiment of the invention, commercially available "MIN-K" (trademark) brand insulation material manufactured by Johns Manville may be used and has a thermal conductivity of about 0.30 BTU-In/Sq. Ft.-Hr-°F. (0.04327 W/M-°C.). Since effective thermal insulation layers, such as layer 60, are typically non-structural layers, the fuel manifold 36a preferably also includes a cover layer 62 completely surrounding the insulation layer 60 which is substantially rigid, for example, for protecting the insulation layer 60 from physical damage. In the preferred embodiment of the present invention, the cover layer 62 is also preferably impervious to the fuel so that any leaks of fuel from the manifold tube 58a are contained by the cover layer 62. The cover layer 62 in accordance with one embodiment of the present invention is preferably a composite prepreg such as a ceramic matrix composite in the form of tape or cloth which provides additional thermal insulation of the tube 58a and the fuel flowable therein.

As illustrated in FIG. 6, both the insulation layer 60 and the cover layer 62 are preferably in the form of tapes which are conventionally wound around the manifold tube 58a. The cover layer 62 is conventionally impregnated with a conventional hardening agent and baked at a suitably high temperature in a conventional manner for curing the cover layer 62 for forming a relatively hard cover layer 62 for protecting the insulation layer 60.

Referring again to FIGS. 2 and 3, since the manifold tubes 58a and 58b are preferably mounted inside the casing 26, respective fuel inlet conduits 64a, 64b extend from outside the casing 26, through the casing 26, and are conventionally joined in flow communication with the manifold tubes 58a, 58b, respectively, for providing fuel thereto. The inlet conduits 64a are conventionally joined to a conventional first fuel supply 66a conventionally mounted outside the casing 26, and the fuel inlet conduits 64b are similarly conventionally joined to conventional second fuel supplies 66b also conventionally disposed outside of the casing 26.

As illustrated in FIGS. 3 and 5, each of the fuel manifolds 36a, 36b has its own respective dimensions. For example, the radially inner manifold tube 58a has a nominal radius R measured from the engine centerline 12, a circumferential length C, and an outside diameter $D_t$. Of course, the cover layer 62 has similar dimensions including, for example, an outer diameter $D_c$, which is greater than $D_t$.

It is conventionally known that thermal expansion and contraction of a material is equal to the product of a linear dimension of that material, such as R, C, and $D_t$; the conventional thermal coefficient of expansion; and the differential temperature experienced by the material. Since the cover layer 62 is preferably substantially rigid in the preferred embodiment of the present invention, and is formed from a different material than that of the manifold tube 58a, thermally induced differential movement of these two members during operation of the combustor 18 may damage the cover layer 62, which in the preferred embodiment of the present invention is ceramic.

Accordingly, in order to reduce or eliminate the differential thermal movement between the manifold tube 58a and the rigid cover layer 62, the cover layer 62 preferably has a thermal coefficient of expansion which is preselected so that the product of a linear dimension of the cover layer 62, its thermal coefficient of expansion, and the expected differential temperature during operation of the combustor 18 matches or substantially matches the product of a respective linear dimension of the manifold tube 58a, its thermal coefficient of expansion, and its expected differential temperature during operation of the combustor 18. Since the fuel channeled through the manifold tube 58a is relatively cool, and since the compressor discharge air 34 channeled over the cover layer 62 is relatively hot, the differential temperatures experienced by the manifold tube 58a will be less than the differential temperature experienced by the cover layer 62 during operation. Accordingly, the cover layer 62 preferably has a thermal coefficient of expansion less than the thermal coefficient of expansion of the manifold tube 58a for reducing the thermal differential movement between the manifold tube 58a and the cover layer 62.

For example, since the radius R of the manifold tube 58a is equal to the corresponding radius of the cover layer 62, then the two operative parameters for obtaining differential thermal movement therebetween are the thermal coefficients of expansion and the differential temperatures. Accordingly, the coefficients of expansion of the tube 58a and the cover layer 62 are preselected so that the product of the tube thermal coefficient of expansion and the tube differential temperature is substantially equal to the product of the thermal coefficient of expansion of the cover layer 62 and the cover layer differential temperature. In this way, differential radial movement between the tube 58a and the cover layer 62 is reduced or eliminated for thusly protecting the cover layer 62. Such differential radial movement is more significant in an embodiment of the invention having a completely annular, single manifold tube 58a. However, by using discrete and unconnected manifold tube segments such as the two segments 58a, differential radial movement is substantially reduced.

Similarly, differential thermal movement between the tube 58a and cover layer 62 also occurs along the circumferential length C as illustrated in FIG. 3 and, with the linear dimension C being substituted for the linear dimension R, the preferred coefficients of expansion as above described also reduce or eliminate differential thermal movement along the circumferential direction. And, thermal differential movement is also reduced or eliminated in the radial direction through a cross section of the tube 58a and the cover layer 62 for the linear dimensions $D_t$ and $D_c$ as illustrated in FIG. 5.

As illustrated in FIGS. 4 and 5, the manifold tube 58a includes a plurality of relatively short manifold stems 68 to which the fuel injector 56 is conventionally joined. For example, the fuel injector 56 includes a relatively short injector stem 70 suitably joined to the manifold stem 68, by brazing for example, and an injector tip 72 suitably joined to the stem 70, also by brazing for example. Referring also to FIG. 3, the manifold stems 68 of the inner manifold tubes 58a extend radially inwardly, and the manifold stems 68 of the outer manifold tubes 58b extend radially outwardly. In the preferred embodiment of the present invention, the thermal insulation layer 60 and the cover layer 62 are disposed also on the manifold and fuel injector stems 68 and 70, as well as on the fuel inlet conduits 64a and 64b. In the preferred embodiment of the present invention, the thermal insulation layer 60 and the ceramic cover layer 62 are preselected for having suitably low thermal conductivity and suitable number of layers for providing thermal insulation of the manifold tube 58a for maintaining an internal wetted wall temperature of the tube below about 350° F. (177° C.) to prevent coking of the fuel therein, even though the manifold 36a is subject to the hot compressor discharge air 34 which may be at least 1000° F. (538° C.).

As illustrated in FIGS. 3 and 4, each of the manifold tubes 58a, 58b also includes an end cap 74 at each circumferential end thereof, around which both the thermal insulation layer 60 and the cover layer 62 are also provided. Adjacent end caps 74 of adjacent manifold tubes 58a, and 58b, respectively, form gaps G therebetween. Although a fully annular, 360° manifold tube 58a or 58b could be used in other embodiments of the present invention, it is preferred that the manifold tubes are provided in arcuate, segmented portions which, for example, reduces the differential thermal movement between the manifold tubes and the cover layer 62 in the radial direction relative to the engine centerline axis 12 as described above.

Also as illustrated in FIG. 3, wherein the double annular dome 44 is used, the two radially inner manifold tubes 58a and respective gaps G are disposed or oriented, relative to the centerline axis 12, about 90° relative to the orientation or position of the two radially outer manifold tubes 58b and respective gaps G so that the fuel inlet conduits 64a of the inner manifold 36a pass between the gaps G formed between adjacent ones of the outer manifold tubes 58b and extend to the casing 26. This provides for a more compact arrangement of the inner and outer manifolds 36a and 36b which allows the fuel inlet conduits 64a of the inner manifold tubes 58a to pass between the outer manifold tubes 58b to reach the first fuel supply 66 outside of the casing 26.

Furthermore, as illustrated additionally in FIG. 2, the two manifolds 36a and 36b are preferably positioned near the center of the dome 44 radially between the outer and inner carburetors 50 and 52 for further increasing the compactness thereof, and therefore reducing the fuel flow distance between the manifolds 36a, 36b and the corresponding fuel injectors 56.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. For a gas turbine engine having a combustor disposed radially inside an annular casing, a fuel manifold for providing fuel to said combustor comprising:

an arcuate manifold tube disposed radially inside said casing and subject to high temperature compressor discharge air during operation of said combustor;

a thermal insulation layer disposed on and completely surrounding said tube; and a cover layer disposed on and completely surrounding said insulation layer and being substantially rigid for protecting said insulation layer from physical damage, wherein said tube has a thermal coefficient of expansion and said cover layer has a thermal coefficient of expansion less than said tube thermal coefficient of expansion.

2. A fuel manifold according to claim 1, wherein said tube is subject to a differential temperature, and said cover is subject to a different differential temperature, and said tube and cover layer coefficients of expansion are preselected so that the product of said tube thermal coefficient of expansion and said tube differential temperature is substantially equal to the product of said cover layer thermal coefficient of expansion and said cover layer differential temperature.

3. For a gas turbine engine having a combustor disposed radially inside an annular casing, a fuel manifold for providing fuel to said combustor comprising:

an arcuate manifold tube disposed radially inside said casing and subject to high temperature compressor discharge air during operation of said combustor;

a thermal insulation layer disposed on and completely surrounding said tube; and a cover layer disposed on and completely surrounding said insulation layer and being substantially rigid for protecting said insulation layer from physical damage, wherein said cover layer is a ceramic matrix composite.

4. For a gas turbine engine having a combustor disposed radially inside an annular casing, a fuel manifold for providing fuel to said combustor comprising:

an arcuate manifold tube disposed radially inside said casing and subject to high temperature compressor discharge air during operation of said combustor;

a thermal insulation layer disposed on and completely surrounding said tube; and a cover layer disposed on and completely surrounding said insulation layer and being substantially rigid for protecting said insulation layer from physical damage, wherein said tube includes a plurality of manifold stems extending radially therefrom and in flow communication therewith for channeling fuel from said manifold tube to a respective plurality of fuel injectors joined to said manifold stems, and thermal insulation layer and said cover layer are disposed also on said manifold stems.

5. For a gas turbine engine having a combustor disposed radially inside an annular casing, a fuel manifold for providing fuel to said combustor comprising:

an arcuate manifold tube;

a thermal insulation layer disposed on and completely surrounding said tube; and a cover layer disposed on and completely surrounding said insulation layer and being substantially rigid for protecting said insulation layer from physical damage, wherein said manifold tube is disposed radially inside said casing and is subject to high temperature compressor discharge air during operation of said combustor, and both said thermal insulation layer and said cover layer have preselected thermal conductivities for providing thermal insulation of said tube for maintaining an internal wetted wall temperature of said tube below about 350° F. (177° C.).

6. A fuel manifold according to claim 5, wherein said manifold comprises two of said arcuate manifold tubes disposed coaxially with each other and together extending circumferentially about 360°.

7. A fuel manifold according to claim 6 wherein each of said manifold tubes extends circumferentially about 180°.

8. A fuel manifold according to claim 7 wherein said manifold tubes are disposed radially inside said casing and further including respective fuel inlet conduits extending from outside and through said casing and joined in flow communication with said manifold tubes for providing fuel thereto.

9. A fuel manifold according to claim 8 further including two of said manifolds, in the form of a radially inner manifold and a radially outer manifold, with said two arcuate manifold tubes of respective ones thereof being disposed about 90° relative to the other two arcuate manifold tubes so that said fuel inlet conduits of said inner manifold pass between gaps formed between adjacent ones of said outer manifold tubes and extend to said casing.

10. A fuel manifold according to claim 9 wherein said combustor includes radially outer and inner liners joined at upstream ends to an annular dome, and said manifold tubes are disposed upstream of said dome and radially between said outer and inner liners.

* * * * *